Nov. 19, 1929.  J. CHUDNER  1,736,578
SPEED CONTROL PULLEY
Filed Jan. 24, 1928
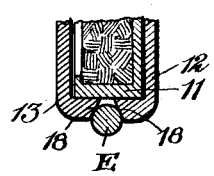
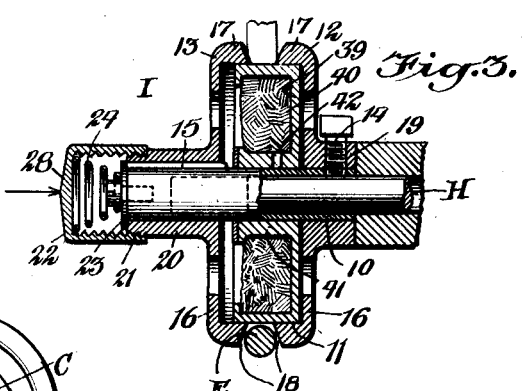
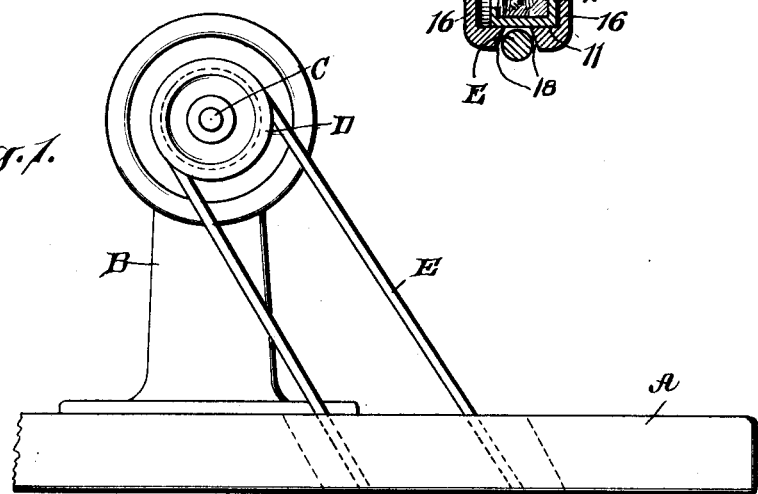
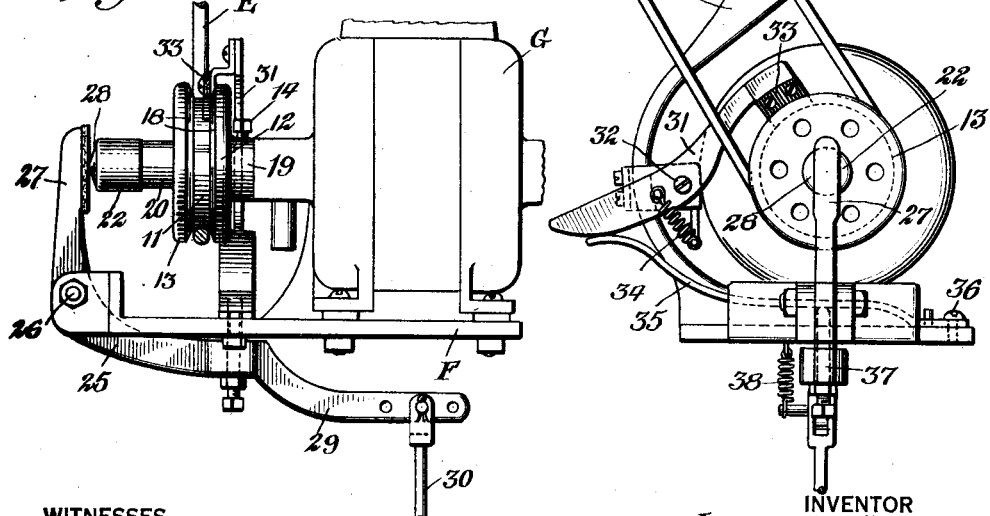
INVENTOR
Joseph Chudner
BY
ATTORNEY
WITNESSES Patented Nov. 19, 1929

1,736,578

UNITED STATES PATENT OFFICE

JOSEPH CHUDNER, OF NEW YORK, N. Y.

SPEED-CONTROL PULLEY

Application filed January 24, 1928. Serial No. 249,122.

This invention relates to drive pulleys for driving a belt connected to a suitable machine to be driven thereby and comprehends a pulley by virtue of which a belt may be driven at the same rate of speed as the pulley or at varying degrees of lesser speeds or completely arrested without removing or shifting the belt from engagement with the pulley.

Belt-driving pulleys are either of the cone type including an idler section to permit variations of speed and idling of the belt or the belts are equipped with a tightening or looseing means which connects and disconnects the belts or controls their relative speed with respect to the driving pulley.

The above forms of belt-driving mechanisms are open to certain objections and the present invention comprehends an improved belt-driving pulley which neither employs a belt-tightening means nor which necessitates the shifting of the belt on to and off of the pulley sections.

More specifically the invention comprehends a belt-driving pulley including a loosely mounted tread element and movable and fixed peripheral flange sections on the tread element carried by a drive shaft for rotation therewith in which the flange sections are provided with confronting outwardly beveled faces defining together with the tread element, a belt groove adapted upon relative separation of the flange sections to permit idling of the belt and adapted upon movement of the flange sections toward each other to grip and drive the belt at varying rates of speed.

The invention furthermore comprehends in a pulley of this character, means for normally moving the movable flange section away from the fixed flange section, together with manually operable means for advancing the movable flange section toward the fixed flange section for the purposes specified.

As a further object the invention comprehends in connection with a pulley of the character set forth, a brake normally disengaged from the tread element, together with means operable by the separation of the flange elements and the release of the belt for applying the brake to instantly arrest the movement of the belt.

Other objects reside in the comparative simplicity of construction and mode of operation of the pulley, the economy with which the same may be manufactured and installed, and the general efficiency derived therefrom.

With the above recited and other objects in view, reference is had to the following description and accompanying drawings in which there is exhibited one example or embodiment of the invention, while the appended claims define the actual scope of the invention.

In the drawings—

Figure 1 is an end view of a pulley constructed in accordance with the invention;

Fig. 2 is a side view thereof;

Fig. 3 is an axial section through the pulley, illustrating the same in idling position;

Fig. 4 is a detail sectional view illustrating the driving position of the pulley.

Referring to the drawings by characters of reference, A designates a table upon which a machine B is mounted, the machine shaft C being provided with a driven pulley D around which a belt E is trained. Supported by a bracket F from the under side of the table A, is a motor G, the motor or drive shaft H of which is connected with the speed control pulley designated generally by the reference character I and which constitutes the present invention.

The pulley preferably consists of a tubular shaft section or hub 10 suitably connected with the drive shaft or motor shaft H for rotation therewith and held against axial movement thereon. The pulley I further includes a tread element 11 loosely mounted on the tubular shaft section or hub 10 and disposed between peripheral flange sections 12 and 13, the former being fixed to the hub or shaft section 10 preferably by the same screw 14 which secures the hub 10 to the drive shaft H. The flange section 13 is connected to the hub 10 for turning movement therewith and for axial sliding movement thereon by a spline key 15. The flange sections 12 and 13 are substantially cup-shaped, each including a disk-like body 16 and an inwardly projecting annular flange 17 adjacent the outer periphery thereof, formed with confronting outwardly beveled faces 18 defining together with the tread element 11, a peripheral inwardly converging belt groove within which the belt E is trained. The flange sections 12 and 13 are provided respectively with hub portions 19 and 20, the latter having an externally threaded free end 21 over which a hollow cap 22 is threaded. The outer end of the tubular shaft section or hub 10 has secured thereto a retaining washer 23 which limits the outward axial movement of the movable flange section 13. A coiled expansion spring 24 is interposed between the washer 23 and the end of the hollow cap 22, for normally effecting relative axial sliding movement of the flange section 13 away from the fixed flange section 12 so that the beveled faces 18 thereof are normally separated a sufficient distance to permit the belt E to be released therefrom and to engage with the intermediate idler section or tread element 11. By exerting a pressure inwardly on the cap 22, it is obvious that the flange section 13 will be advanced toward the fixed flange section 12 to cause the beveled faces 18 to grip the belt E and cam the same radially outwardly from contact with the tread element 11. It is further obvious that the degree to which the belt is gripped by the flange sections up to the complete gripping point, allows for varying degrees of slippage between the belt and the drive pulley to vary the speed of rotation relative to the speed of the drive pulley.

In order to provide means for moving the flange section 13 axially inwardly against the action of the spring 24, a substantially L-shaped or bell-crank lever 25 is employed which is fulcrumed at 26, the arm 27 thereof engaging the conical extremity 28 of the cap 22. The arm 29 of the lever is suitably connected by a connecting rod 30 to a foot pedal or other manual controlling means, not shown. In order to effect a more rapid or instantaneous arresting of the motion of the belt E so as to cause the machine to instantly respond to the action of the operator when stopping of the same is desired, a brake is employed consisting of a brake lever 31 fulcrumed at 32 and provided at one terminal with a brake shoe 33 which is engageable with the periphery of the tread element 11. A spring 34 normally holds the lever in a position to dispose the brake shoe out of contact with the tread element 11. A flexible arm 35 attached to the bracket F at 36, engages the lever terminal 31 and is caused to swing the same so that the shoe engages the tread element 11 immediately upon release of the downward pressure exerted on the arm 29 of the bell crank. This is accomplished through the medium of an actuator stud 37 which is moved upwardly against the arm 35 by a spring 38.

In order to afford means for properly lubricating the parts of the pulley, the tread element 11 is hollow to provide a lubricant chamber 39 in which an absorbent material 40 containing the lubricant is arranged. The hub portion 41 of the tread element is formed with one or more lubricant apertures 42 which permit the lubricant to feed on to the hub and from thence to be distributed to the various working surfaces.

What is claimed is:

1. A pulley, including a hub, a tread element loosely mounted upon said hub, and peripheral flange sections associated with the tread element connected with the hub for rotation therewith and for relative axial movement with respect to each other, whereby upon relative separation of the flange sections, idling of the belt is permitted and whereby upon relative movement of the flange sections toward each other, gripping and driving of the belt is effected.

2. A pulley, including a hub, a tread element loosely mounted upon said sub, and peripheral flange sections associated with the tread element connected with the hub for rotation therewith and for relative axial movement with respect to each other, whereby upon relative separation of the flange sections, idling of the belt is permitted and whereby upon relative movement of the flange sections toward each other, gripping and driving of the belt is effected at varying rates of speed.

3. A pulley, including a hub, a tread element loosely mounted on said hub, axially movable and fixed peripheral flange sections associated with the tread element carried by the hub for rotation therewith, said flange sections having confronting outwardly beveled faces defining with the tread element a belt groove and adapted upon relative separation of the flange sections to permit idling of the belt and further adapted upon movement of the flange sections toward each other to grip and drive the belt.

4. A pulley, including a hub, a tread element loosely mounted on said hub, axially movable and fixed peripheral flange sections associated with the tread element carried by the hub for rotation therewith, said flange sections having confronting outwardly beveled faces defining with the tread element a belt groove and adapted upon relative separation of the flange sections to permit idling of the belt and further adapted upon movement of the flange sections toward each other to grip and drive the belt at varying rates of speed.

5. A pulley, including a hub, a tread element loosely mounted on said hub, axially movable and fixed peripheral flange sections associated with the tread element carried by the hub for rotation therewith, said flange sections having confronting outwardly beveled faces defining with the tread element a belt groove and adapted upon relative separation of the flange sections to permit idling of the belt and further adapted upon movement of the flange sections toward each other to grip and drive the belt at varying rates of speed, means for normally moving the movable flange section away from the fixed flange section, and manually operable means for advancing said movable flange section toward the fixed flange section.

6. A pulley, including a hub, a tread element loosely mounted on said hub, axially movable and fixed peripheral flange sections associated with the tread element carried by the hub for rotation therewith, said flange sections having confronting outwardly beveled faces defining with the tread element a belt groove and adapted upon relative separation of the flange sections to permit idling of the belt and further adapted upon movement of the flange sections toward each other to grip and drive the belt at varying rates of speed, means for normally moving the movable flange section away from the fixed flange section, manually operable means for advancing said movable flange section toward the fixed flange section, a brake normally disengaged from the tread element, and means operable by the separation of the flange sections and the release of the belt for applying the brake to the tread element.

7. A pulley, including a hub, an idler section loosely mounted thereon, a pair of driving sections respectively fixed to and splined on the hub for rotation therewith and disposed at opposite sides of the idler section, said driving sections each having an inwardly projecting annular flange with outwardly beveled faces defining together with the idler section, an inwardly converging belt groove, whereby movement of the driving sections respectively toward and away from each other, causes the beveled faces to grip and release a belt trained around the pulley for driving the same therefrom or permitting the idling of the belt.

8. A pulley, including a hub, an idler section loosely mounted thereon, a pair of driving sections respectively fixed to and splined on the hub for rotation therewith and disposed at opposite sides of the idler section, said driving sections each having an inwardly projecting annular flange with outwardly beveled faces defining together with the idler section, an inwardly converging belt groove, whereby movement of the driving sections respectively toward and away from each other, causes the beveled faces to grip at different degrees and release a belt trained around the pulley, for driving the same at different rates of speed or to permit idling of the belt.

9. A pulley, including a hub, an idler pulley section loosely mounted thereon, complementary annular flange elements having outwardly beveled confronting faces carried by the hub at opposite sides of the idler section for rotation with the hub, means for normally effecting relative axial movement of the elements away from each other for releasing a belt trained around the pulley, to permit idling thereof, and manually operable means for effecting movement of the flange elements toward each other to cause the same to effect driving of the belt by the gripping of the same between the beveled faces.

10. A pulley, including a hub, an idler pulley section loosely mounted thereon, complementary annular flange elements having outwardly beveled confronting faces carried by the hub at opposite sides of the idler section for rotation with the hub, means for normally effecting relative axial movement of the elements away from each other for releasing a belt trained around the pulley, to permit idling thereof, manually operable means for effecting movement of the flange elements toward each other to cause the same to effect driving of the belt by the gripping of the same between the beveled faces, and a brake mounted to act upon the idler section for stopping rotation thereof and for arresting rotation of the belt.

11. A pulley, including a hub, an idler pulley section loosely mounted thereon, complementary annular flange elements having outwardly beveled confronting faces carried by the hub at opposite sides of the idler section for rotation with the hub, means for normally effecting relative axial movement of the elements away from each other for releasing a belt trained around the pulley, to permit idling thereof, manually operable means for effecting movement of the flange elements toward each other to cause the same to effect driving of the belt by the gripping of the same between the beveled faces, a brake mounted to act upon the idler section for stopping rotation thereto and for arresting rotation of the belt, and means of connection between the brake and the manually operable means for applying the brake when the flange sections are separated to release the belt.

Signed at New York, in the county of New York and State of New York this 23rd day of January, A. D. 1928.

JOSEPH CHUDNER.